US011271832B2

(12) United States Patent
Tanaka

(10) Patent No.: US 11,271,832 B2
(45) Date of Patent: Mar. 8, 2022

(54) COMMUNICATION MONITORING APPARATUS AND COMMUNICATION MONITORING METHOD

(71) Applicant: Hitachi, Ltd., Tokyo (JP)

(72) Inventor: Mayuko Tanaka, Tokyo (JP)

(73) Assignee: HITACHI, LTD, Tokyo (JP)

(*) Notice: Subject to any disclaimer, the term of this patent is extended or adjusted under 35 U.S.C. 154(b) by 0 days.

(21) Appl. No.: 17/127,145

(22) Filed: Dec. 18, 2020

(65) Prior Publication Data

US 2021/0203572 A1 Jul. 1, 2021

(30) Foreign Application Priority Data

Dec. 25, 2019 (JP) ............................. JP2019-234060

(51) Int. Cl.
| | | |
|---|---|---|
| *H04L 12/00* | (2006.01) | |
| *H04L 43/04* | (2022.01) | |
| *H04L 43/067* | (2022.01) | |
| *G06K 9/00* | (2022.01) | |
| *H04L 29/06* | (2006.01) | |
| *H04L 43/16* | (2022.01) | |

(52) U.S. Cl.
CPC .......... *H04L 43/04* (2013.01); *G06K 9/00536* (2013.01); *H04L 43/067* (2013.01); *H04L 43/16* (2013.01); *H04L 63/1425* (2013.01); *H04L 63/306* (2013.01)

(58) Field of Classification Search
CPC ..... H04L 63/306; H04L 43/16; H04L 43/067; H04L 63/1425; H04L 43/04; G06K 9/00536

USPC .................................................. 709/224, 225
See application file for complete search history.

(56) References Cited

U.S. PATENT DOCUMENTS

| | | | | |
|---|---|---|---|---|
| 6,668,282 | B1* | 12/2003 | Booth, III | H04L 41/0681 709/223 |
| 8,054,850 | B2* | 11/2011 | Demachi | H04L 12/40 370/438 |
| 10,469,311 | B2* | 11/2019 | Volz | H04L 41/046 |
| 2013/0332600 | A1* | 12/2013 | Amaya Calvo | H04L 43/08 709/224 |

(Continued)

FOREIGN PATENT DOCUMENTS

JP 2008154010 A 7/2008

*Primary Examiner* — Frantz Coby
(74) *Attorney, Agent, or Firm* — Procopio, Cory, Hargreaves & Savitch LLP

(57) ABSTRACT

A communication monitoring apparatus holds a communication pair model and the number of communications of a communication pair generated during, before, and after a determination target period, calculates the number of model communications of the other of the pair during the determination target period from the communication pair model and the number of communications of one of the pair, compares a value based on a difference between the number of communications of the other of the pair and the number of model communication with a threshold value, and if an abnormality is determined to have possibly occurred in a communication of the communication pair during the determination target period, based on the number of communications of the communication pair during a total time, and on the communication pair model, determine whether the abnormality has occurred in the communication of the communication pair.

10 Claims, 13 Drawing Sheets

(56) References Cited

U.S. PATENT DOCUMENTS

| | | | |
|---|---|---|---|
| 2016/0359592 A1* | 12/2016 | Kulshreshtha | H04L 41/22 |
| 2018/0048666 A1* | 2/2018 | Alderson | H04L 45/20 |
| 2019/0116085 A1* | 4/2019 | Zhang | H04L 43/50 |
| 2020/0336195 A1* | 10/2020 | Hu | H04W 24/10 |

\* cited by examiner

FIG. 4

| TIME SLOT | K1 | K2 |
|---|---|---|
| : | 3 | 3 |
| : | 10 | 9 |
| : | 3 | 1 |
| : | 4 | 3 |
| : | 2 | 2 |
| : | 23 | 20 |
| : | 5 | 4 |
| : | 5 | 5 |
| : | 1 | 1 |
| : | 4 | 3 |
| t0 | 3 | 2 |
| t1 | 47 | 5 |
| t2 | 3 | 50 |
| t3 | 8 | 6 |
| : | 3 | 1 |
| : | 4 | 3 |
| : | 5 | 4 |
| : | 5 | 5 |
| : | 40 | 36 |
| : | 6 | 6 |
| : | 3 | 0 |
| : | 4 | 3 |
| : | 2 | 2 |
| : | 23 | 22 |

FIG. 9

| BUSINESS COMMUNICATION IDENTIFIER TABLE 201 | | | |
|---|---|---|---|
| ID-1 | SOURCE DEVICE | DESTINATION DEVICE | PORT |
| K1 | DEVICE 10A | DEVICE 12A | 10 |
| K2 | DEVICE 12A | DEVICE 12B | 10 |
| K3 | DEVICE 12A | DEVICE 10B | 20 |
| K4 | DEVICE 10B | DEVICE 10A | 20 |
| ⋮ | ⋮ | ⋮ | ⋮ |

| BUSINESS COMMUNICATION PAIR MODEL TABLE 204 | | | | | |
|---|---|---|---|---|---|
| ID-2 | X | Y | SLOPE | INTERCEPT | THRESHOLD REFERENCE |
| KP1 | K1 | K2 | 1.09 | 0.30 | 0.79 |
| KP1 | K1 | K3 | 0 | 0 | 0 |
| KP2 | K1 | K4 | 0 | 0 | 0 |
| KP3 | K2 | K3 | 0 | 0 | 0 |
| KP4 | K2 | K4 | 0 | 0 | 0 |
| KP5 | K3 | K4 | 1.15 | 1.31 | 1.18 |
| ⋮ | ⋮ | ⋮ | ⋮ | ⋮ | ⋮ |

801　802　803　804　805　806

BUSINESS COMMUNICATION TABLE 205

| TIME | NUMBER OF COMMUNICATIONS | | | | |
|------|------|------|------|------|-----|
|      | K1 | K2 | K3 | K4 | .. |
| T1   | 1  | 1  | 0  | 1  |    |
| T2   | 3  | 3  | 3  | 3  |    |
| T3   | 2  | 2  | 2  | 4  |    |
| T4   | 1  | 1  | 1  | 0  |    |
| T5   | 6  | 7  | 6  | 4  |    |
| :    | :  | :  | :  | :  | :  |
| T101 | 19 | 21 | 3  | 3  |    |
| T102 | 4  | 4  | 6  | 6  |    |
| T103 | 24 | 26 | 0  | 1  |    |
| T104 | 5  | 4  | 3  | 4  |    |
| T105 | 11 | 12 | 2  | 2  |    |
| T106 | 6  | 5  | 8  | 10 |    |

| TIME SLOT | KP1 | KP2 | MODEL KP2 | KP2 DIFFERENCE | | K1 TOTAL | K2 TOTAL | MODEL KP2 TOTAL | TOTAL DIFFERENCE |
|---|---|---|---|---|---|---|---|---|---|
| t0 | 3 | 2 | 3 | 1 | t(n) + t(n-1) | 50 | 7 | 50 | 43 |
| t1 | 47 | 5 | 47 | 42 | - | - | - | | - |
| t2 | 3 | 50 | | | t(n) + t(n+1) | 50 | 55 | 50 | 5 |

1801  1802  1803  1804    1811  1812  1813  1814

COMMUNICATION MONITORING APPARATUS AND COMMUNICATION MONITORING METHOD

INCORPORATION BY REFERENCE

This application claims priority based on Japanese patent application, No. 2019-234060 filed on Dec. 25, 2019, the entire contents of which are incorporated herein by reference.

BACKGROUND

The present invention relates to a communication monitoring apparatus and a communication monitoring method.

As a related art in this technical field, there is JP 2008-154010 A. In this publication, the description is made that "a data input/processing unit 420 aggregates input data 410 for each unit time, a feature quantity analysis unit 430 divides the aggregated data into predetermined areas and analyzes the main components for each area to calculate a feature quantity, a protrusion point determination unit 440 arranges the feature quantity of each area on a two-dimensional plane to determine a protrusion rate from the distribution of the feature quantity, a smoothing coefficient calculation unit 450 assigns a protrusion rate of the corresponding area to each piece of data after the aggregation by the data input/processing unit 420 and calculates a relative evaluation value in the area of each piece of data, and calculates a smoothing coefficient that makes the relative evaluation value of each piece of data and the protrusion rate of the area of each piece of data become proportional to the number of pieces of data to be a target of moving average calculation performed by a smoothing unit 460, and the smoothing unit 460 obtains the number of pieces of target data of performing the moving average based on the smoothing coefficient, and performs smoothing of each piece of data after the aggregation by the data input/processing unit 420" (See Abstract).

In published unexamined patent application JP 2008-154010 A, it is described that the noise can be removed from time-series data used as learning data to increase a degree of smoothing for data values deviating from other pieces of data and to improve accuracy of abnormality detection.

SUMMARY

However, J P 2008-154010 A does not consider false positives caused by the input data straddling the unit aggregation periods. Therefore, an object of one aspect of the present invention is to suppress false positives in which normal communication is determined as malicious communication, in consideration of the fact that the communication straddles the unit aggregation periods.

In order to solve the above problem, one aspect of the present invention adopts the following configuration. A communication monitoring apparatus that monitors communication of a monitoring target system includes a processor and a memory. The memory holds a communication pair model and communication information, the communication pair model indicating a relationship of the number of communications of a communication pair in the monitoring target system and generated based on the number of communications of the communication pair generated in the common time band, the communication information indicating the number of communications of each of the communication pair generated during a determination target period, and a predetermined number of periods before or after the determination target period. The processor obtains the number of communications of each of the communication pair during the determination target period from the communication information, calculates the number of model communications of the other of the communication pair during the determination target period from the communication pair model and the number of communications of one of the communication pair during the determination target period, if an abnormality is determined to have possibly occurred in a communication of the communication pair during the determination target period based on a comparison result of comparing a value based on a first difference being a difference between the number of communications of the other of the communication pair during the determination target period and the number of model communications, with a threshold value based on a residual of the communication pair model, obtains the number of communications of the communication pair during at least one period of before or after the determination target period, from the communication information, and based on the number of communications of the communication pair during a period formed by adding the determination target period and the at least one period, and on the communication pair model, determines whether the abnormality has occurred in the communication of the communication pair.

According to one aspect of the present invention, the false positives in which normal communication is determined to be malicious communication can be suppressed.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is an example of aggregated data, for each time slot, of the number of input communications monitored by the communication monitoring apparatus according to the first embodiment;

FIG. 9 is an example of a business communication identifier table according to the first embodiment;

FIG. 10 is an example of a business communication pair model table according to the first embodiment;

DESCRIPTION OF THE EMBODIMENTS

Figure 1:
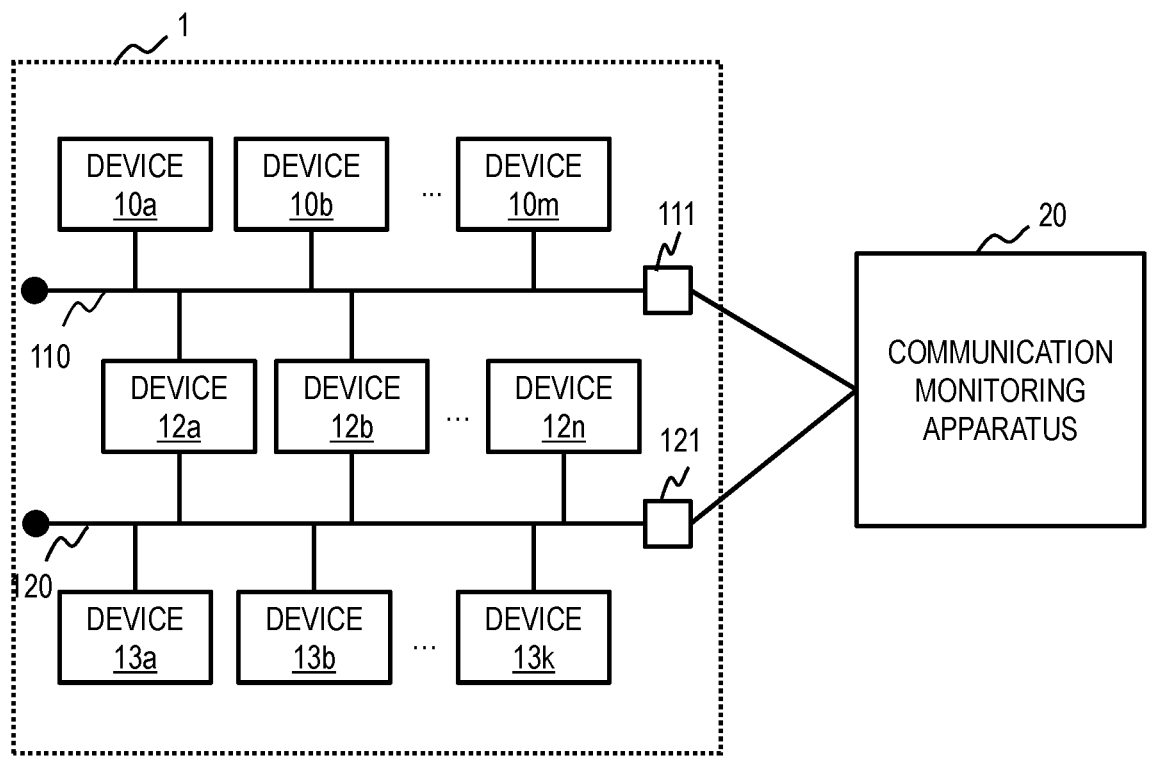
FIG. 1 is a block diagram showing a configuration example of a communication system according to a first embodiment.

The present embodiment relates to "Cybersecurity for Critical Infrastructure" which is the Cross-ministerial Strategic Innovation Promotion Program (SIP) of the Council for Science, Technology and Innovation, promoted by the New Energy and Industrial Technology Development Organization (NEDO).

Hereinafter, an embodiment of the present invention is described with reference to the accompanying drawings. It should be noted that the present embodiment is merely an example for realizing the present invention and does not limit the technical scope of the present invention. The same reference numerals are given to common configurations in each figure.

First Embodiment

In the present embodiment, a description is made of a communication monitoring system in which false positives of determining normal business communication as malicious communication is suppressed, the false positives occurring in a mode that detects abuse by comparing a model with the number of input communications aggregated while being delimited by time slots and occurring due to a communication sequence straddling the time slots.

FIG. 1 is a block diagram showing a configuration example of a communication system of the present embodiment. The communication system includes, for example, a monitoring target system 1 and a communication monitoring apparatus 20. The communication monitoring apparatus 20 collects communication data of the monitoring target system 1 (in the present embodiment, collects packets as an example of the communication data), and extracts a feature quantity of communication of the monitoring target system 1 in a steady state. Further, the communication monitoring apparatus 20 models the steady state from the extracted feature quantity. Further, the communication monitoring apparatus detects the abuse of the normal communication from the difference between the model and the communication at the time of monitoring.

The monitoring target system 1 includes, for example, a plurality of networks (network 110 and network 120 in the example of FIG. 1). To each network, a plurality of devices having various roles (devices 10a to 10m, devices 12a to 12n, and devices 13a to 13k in the example of FIG. 1) are connected.

For example, in the case of the monitoring target system 1 being an industrial control system (ICS), the network 110 is an information/control network, and the network 120 is a control network. The devices 10a to 10m connected to the information/control network (network 110) are, for example, a system monitoring server that monitors the operation of the entire system, a server that manages the operation plan of the system, a maintenance server, and others.

The devices 12a to 12n connected to the information/control network (network 110) and the control network (network 120) are control servers that transmit control instructions to the devices connected to the control network (network 120) and collect log information according to, for example, an instruction from the system monitoring server.

The devices 13a to 13k connected to the control network (network 120) are, for example, programmable controllers (PLCs) that set the rotation speed of a motor and collect setting information according to an instruction of the control server.

The monitoring target system 1 has a plurality of mirror ports (mirror port 111 and mirror port 112 in the example of FIG. 1) connected to the communication monitoring apparatus 20. Each mirror port transmits a copy of the communication flowing through each network of the monitoring target system 1 to the communication monitoring apparatus 20.

Figure 2:
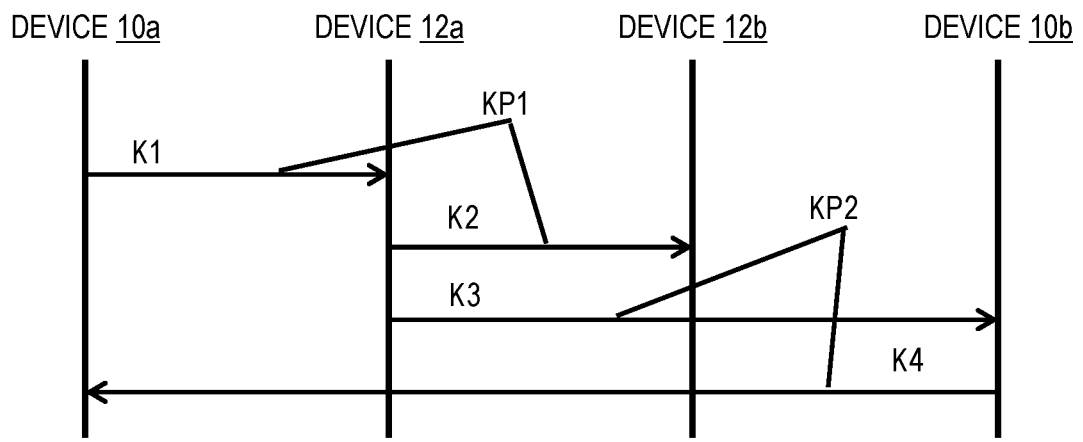
FIG. 2 is an explanatory diagram showing an example of normal communication to be detected by a communication monitoring apparatus according to the first embodiment.

FIG. 2 is an explanatory diagram showing an example of the normal communication to be detected by the communication monitoring apparatus 20. A communication K1 from the device 10a to the device 12a, a communication K2 from the device 12a to the device 12b, a communication K3 from the device 12a to the device 10b, and a communication K4 from the device 10b to the device 10a are all normal communications that are generated when the monitoring target system 1 is normally operating. KP1 and KP2 each indicates a normal communication pair having a strong business relationship (hereinafter, also referred to as a business communication pair), the KP1 consisting of the communication K1 and the communication K2, and the KP2 consisting of the communication K3 and the communication K4. A pair of communications having a strong business relationship is, for example, a pair of communications that have a relationship such that the normal communication K2 is generated by the normal communication K1.

For example, any of the followings may constitute the business communication pair: (1) a type of business in which two devices communicate with each other, such as existence confirmation, or transmission and response of business execution requests; (2) business of receiving communication from one device and making communication to another device, such as instruction to slave devices, or transmission of data and logs, executed upon receiving a business execution request from a host device; (3) business of making communication from one device to plural devices, such as data distribution performed at the same timing from a host device to plural slave devices, or data transmission to two devices having a redundant configuration for the purpose of robustness; and (4) business of making communication from plural devices to one device, such as notification of instruction execution results from slave devices to a host device.

Figure 3:
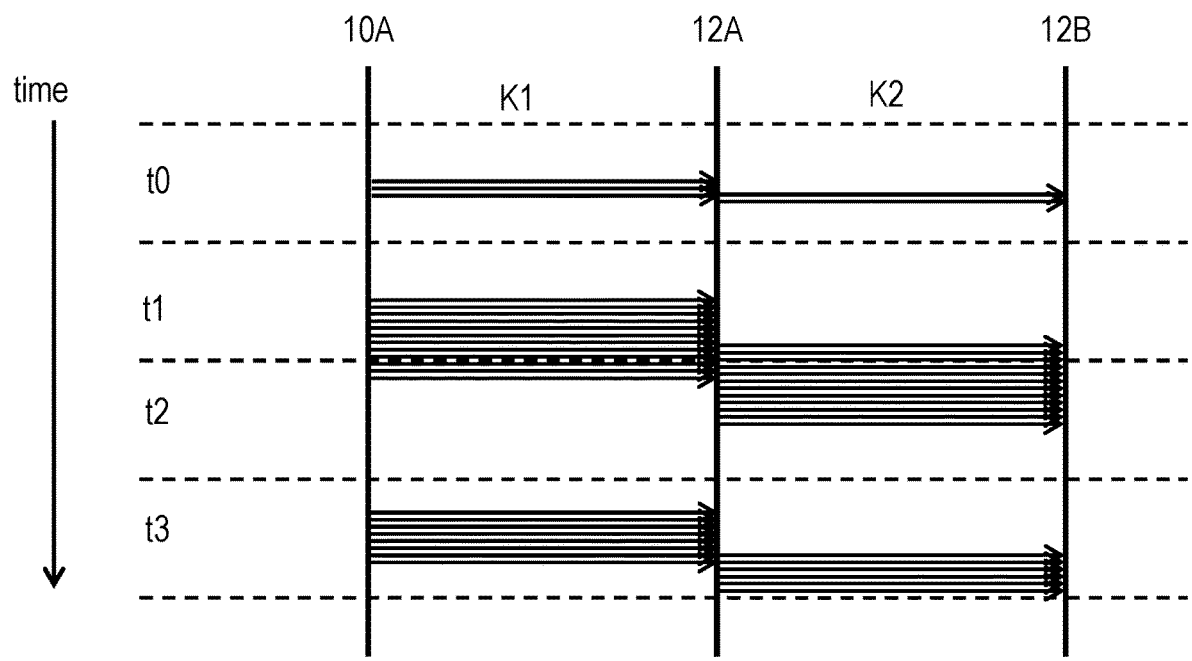
FIG. 3 is an explanatory diagram showing an example of a time series of input communication monitored by the communication monitoring apparatus according to the first embodiment.

FIG. 3 is an explanatory diagram showing an example of a time series of input communication monitored by the communication monitoring apparatus 20. A vertical downward arrow in FIG. 3 indicates the elapse of time. t0, t1, t2, and t3 are time slots indicating a time band in which input communication has been performed, and horizontal broken lines indicate delimiters of the time slots. Here, the normal communication K1 and the normal communication K2 are input communications to be monitored by the communication monitoring apparatus 20. In the example of FIG. 3, a plurality of communications exchanged in one processing sequence are represented by arrows.

FIG. 4 is an example of aggregated data, for each time slot, of the number of input communications monitored by the communication monitoring apparatus 20 shown in FIG. 3. A column 401 shows the time slot, a column 402 shows the number of communications of the normal communication K1 in the corresponding time slot, and a column 403 shows the number of communications of the normal communication K2 in the corresponding time slot.

In the examples of FIGS. 3 and 4, in the time slots t1 and t2, a state has occurred, in which the business processing sequence of the combination of the normal communication K1 and the normal communication K2 straddles the time slots (hereinafter, also referred to as time slot straddle).

Figure 5:
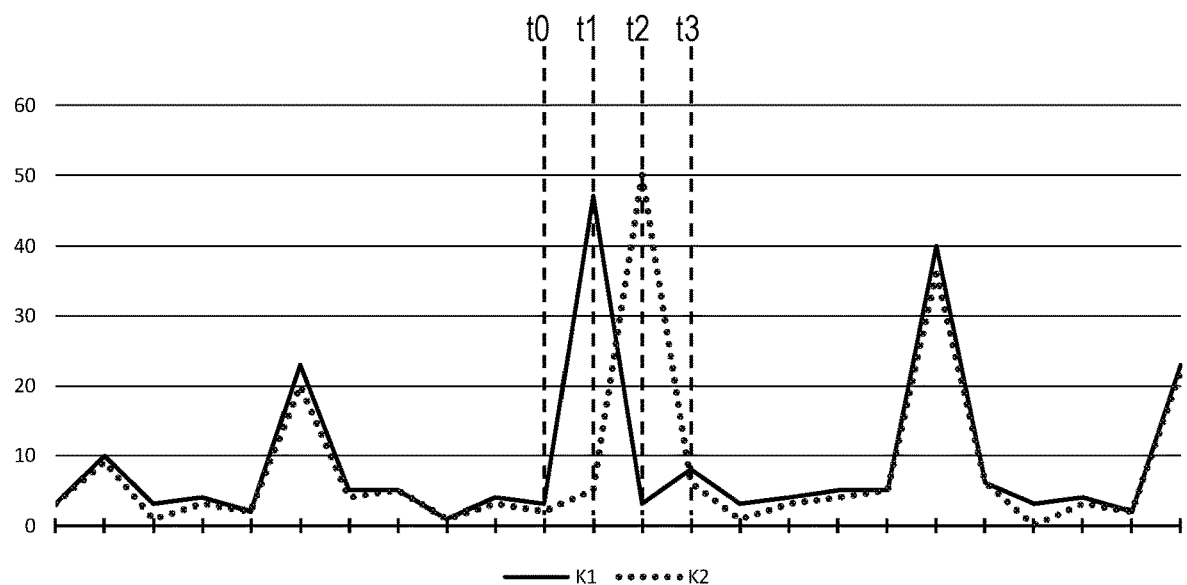
FIG. 5 is an example of a time axis graph of the aggregated data of FIG. 4 according to the first embodiment.

FIG. 5 is a time axis graph of the aggregated data of FIG. 4. The horizontal axis shows the time slots, and the vertical axis shows the number of communications delimited by the time slots and aggregated. In FIG. 5, the number of communications of the normal communication K1 is shown by a solid line graph, and the number of communications of the normal communication K2 is shown by a dotted line graph. t0, t1, t2, and t3 are the time slots t1, t2, and t3 shown in FIGS. 3 and 4.

Figure 6:
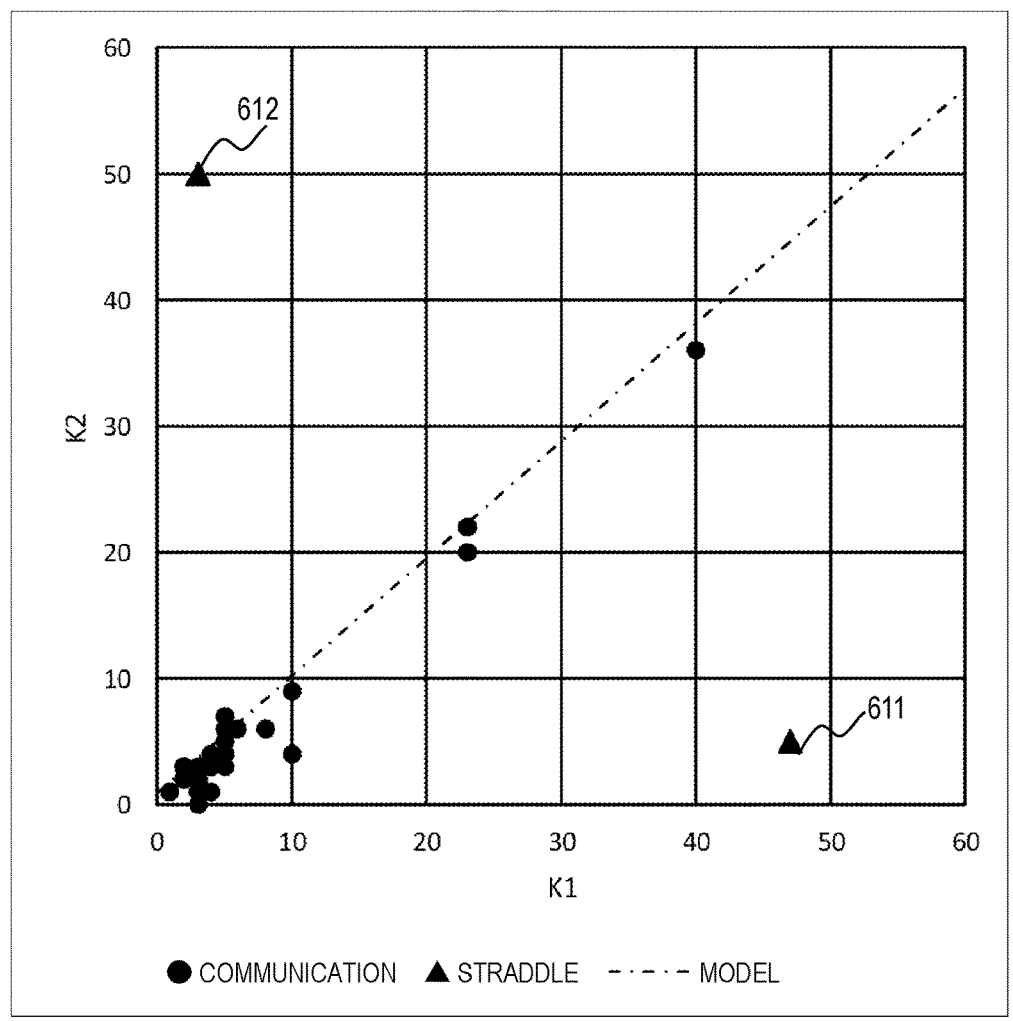
FIG. 6 is an example of a dispersion diagram showing the number of normal communications according to the first embodiment.

FIG. 6 is a dispersion diagram showing the number of communications of the normal communication K1 and the normal communication K2. The horizontal axis shows the number of communications of the normal communication K1, and the vertical axis shows the number of communications of the normal communication K2. Points 611 and 612 drawn with black triangle symbols in the figure indicate the number of communications of the normal communication K1 and the normal communication K2 at t1 and t2 where the time slot straddle has occurred, respectively. A one dot chain line in the figure is a model showing the relevance between the number of communications of the normal communication K1 and the normal communication K2 obtained by learning in advance from the normal communication K1 and the normal communication K2.

In this way, in the time slot t1 and the time slot t2 in which the time slot straddle has occurred, the number of communications of the normal communication K1 and the normal communication K2 deviate greatly from the model. Therefore, when the malicious communication is detected only according to the model, the false positives occurs that the malicious communication is considered to be made even though the normal business communication is made. Hereinafter, an example is described, in which the communication monitoring apparatus 20 appropriately detects and corrects a portion where the business processing sequence straddles the time slots, to suppress false positives caused by the time slot straddle.

Figure 7:
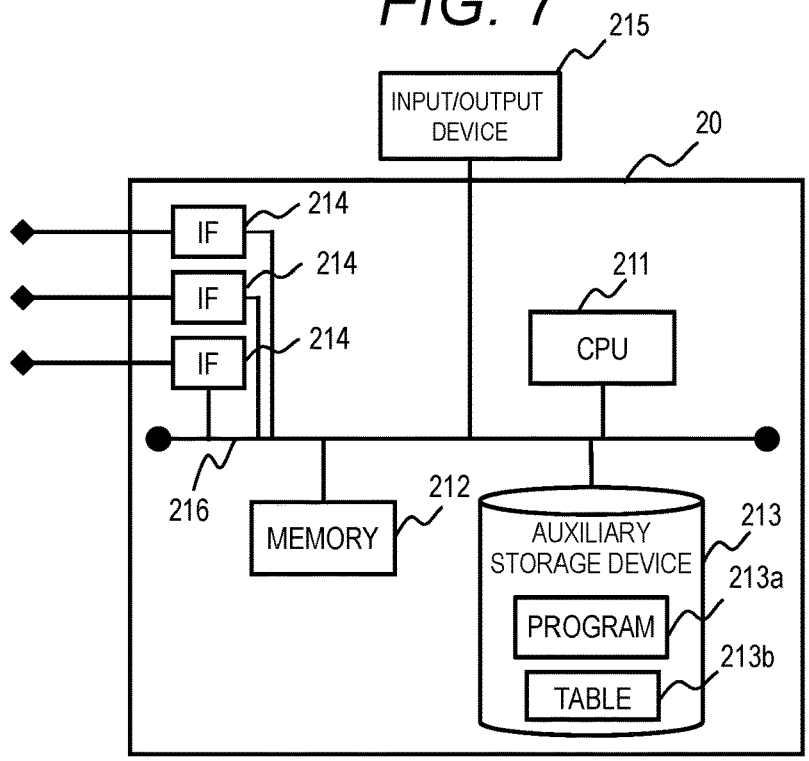
FIG. 7 is a block diagram showing a hardware configuration example of the communication monitoring apparatus according to the first embodiment.

FIG. 7 is a block diagram showing a hardware configuration example of the communication monitoring apparatus 20. The communication monitoring apparatus 20 is constituted of a computer that includes, for example, a central processing unit (CPU) 211, a memory 212, an auxiliary storage device 213, a plurality of interfaces (IFs) 214, and an input/output device 215, which are connected to each other by an internal communication line such as a bus 216, and the bus 216.

The CPU 211 includes a processor, executes various programs loaded in the memory 212, and realizes various functions of the communication monitoring apparatus 20. The memory 212 includes a read only memory (ROM) which is a non-volatile storage element and a random access memory (RAM) which is a volatile storage element. The ROM stores immutable programs (e.g., BIOS). The RAM is a high-speed and volatile storage element such as a dynamic random access memory (DRAM), and temporarily stores a program executed by the CPU 211 and data used when the program is executed.

The auxiliary storage device 213 is, for example, a large-capacity and non-volatile storage device such as a magnetic storage device (hard disk drive (HDD)) or a flash memory (solid state drive (SSD)), and stores a program 213a executed by the CPU 211 and data (such as a table 213b) used when the program 213a is executed.

That is, the program 213a is read from the auxiliary storage device 213, loaded into the memory 212, and executed by the CPU 211. A part or all of the data stored in the memory 212 may be stored in the auxiliary storage device 213, or a part or all of the data stored in the auxiliary storage device 213 may be stored in the memory 212.

The program 213a may be stored in the auxiliary storage device 213 in advance, may be introduced from a non-temporary storage device of another apparatus via a network to which the IF 214 or a communication IF unit (not shown) is connected, or may be introduced from a detachable non-temporary storage medium that can be read by the computer constituting the communication monitoring apparatus 20.

The IF 214 is a network interface unit that controls communication with other apparatuses according to a predetermined protocol, and is used to connect the communication monitoring apparatus 20 to the network of the monitoring target system 1. Communication packets of the monitoring target system 1 constituted of multiple networks are collected by the plurality of IFs 214.

The input/output device 215 is a unit that receives input from a user and outputs an execution result of the program 213a in a format that can be visually recognized by the user, and is, for example, a keyboard, a mouse, and/or a display. The input/output device 215 may be connected without being included in the computer constituting the communication monitoring apparatus 20.

Figure 8:
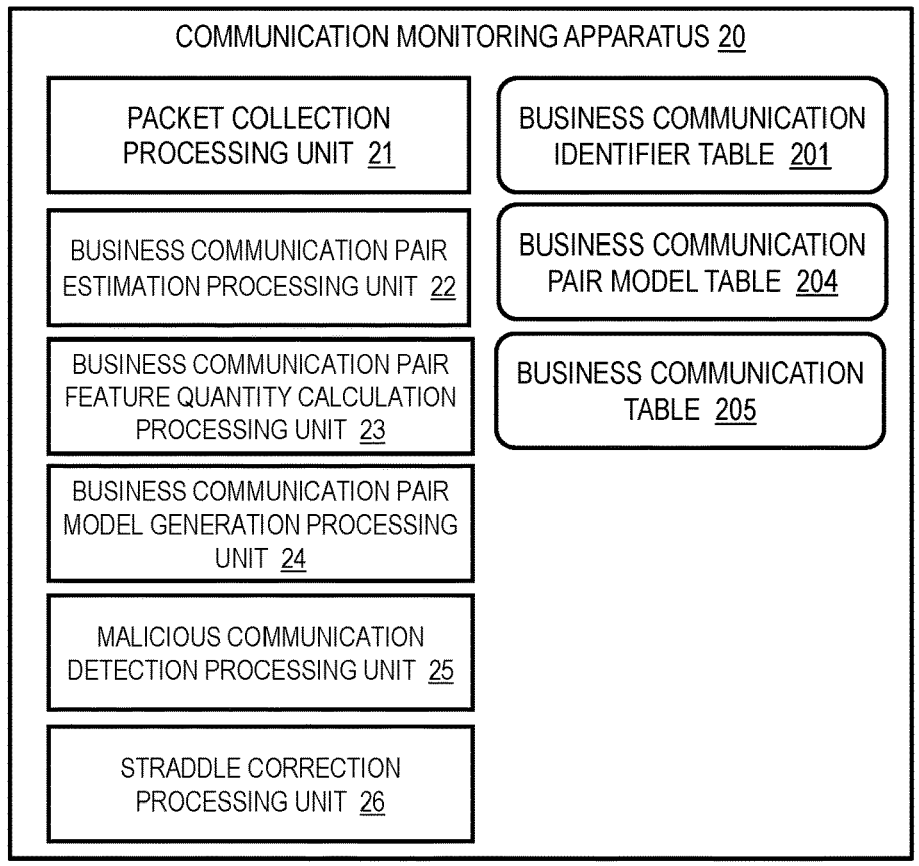
FIG. 8 is a block diagram showing a functional configuration example of the communication monitoring apparatus according to the first embodiment.

FIG. 8 is a block diagram showing a functional configuration example of the communication monitoring apparatus 20. The communication monitoring apparatus 20 detects abuse using the normal communication by collecting, analyzing, and learning communication packets flowing through the network of the monitoring target system 1.

The communication monitoring apparatus 20 includes a packet collection processing unit 21, a business communication pair estimation processing unit 22, a business communication pair feature quantity calculation processing unit 23, a business communication pair model generation processing unit 24, an malicious communication detection processing unit 25, and a straddle correction processing unit 26, and a program for realizing the functions of these processing units is stored in the auxiliary storage device 213 as the program 213a.

For example, the CPU 211 functions as the packet collection processing unit 21 by operating according to a packet collection processing program loaded in the memory 212, and functions as the business communication pair estimation processing unit 22 by operating according to a business communication pair estimation processing program loaded in the memory 212. The relationship between the program and the processing unit is the same for the other processing units included in the communication monitoring apparatus 20.

Note that some or all of the functions of the processing units of the communication monitoring apparatus 20 may be realized by hardware such as an application specific integrated circuit (ASIC) or a field-programmable gate array (FPGA).

Further, the communication monitoring apparatus 20 holds a business communication identifier table 201, a business communication pair model table 204, and a business communication table 205. These tables are stored in the auxiliary storage device 213 as the table 213b, and are expanded in the memory 212 when being used for processing.

In the present embodiment, the information used by the communication monitoring apparatus 20 does not depend on a data structure and may be represented by any data structure. In the present embodiment, an example in which information is expressed in a table format is described. However, the information can be stored in a data structure appropriately selected from a list, a database, or a queue.

The packet collection processing unit 21 collects communication packets flowing through the network of the monitoring target system 1 via the IF 214. The packet collection processing unit 21 assigns an identifier associated with the meta information of the collected communication packet to the communication packet, and generates a business communication identifier table 201 that manages the association. Note that "per unit time" and "delimited by time slot" are synonymous. Hereinafter, this data is also simply referred to as aggregated data. The meta information includes, for example, IP address, communication protocol, port number, and others of a communication source device and a communication destination device.

The communication registered in the business communication identifier table 201 is regarded as the communication that performs normal business (normal communication) of the monitoring target system 1. Further, the packet collection processing unit 21 generates the business communication table 205 in which the number of communication packets per unit time is stored for each identifier.

The business communication pair estimation processing unit 22 calculates the strength of the business relationship as a degree of business relevance for all the combinations of normal communications registered in the business communication identifier table 201 by using the information in the business communication table 205.

The business communication pair feature quantity calculation processing unit 23 uses the information in the business communication table 205 to calculate the feature quantity indicating the relationship of the business communication pair for the business communication pair having a strong business relationship shown in a business communication pair estimation table 202. The business communication pair model generation processing unit 24 uses the information registered in the business communication table 205 for all the combinations of normal communications registered in the business communication identifier table 201 to calculate a model indicating the strength of the business relationship and the steady state of the business communication pair and to register the model in the business communication pair model table 204.

When data newly input in the business communication table 205 is a business communication pair, the malicious communication detection processing unit 25 calculates a degree of deviation from an estimated value calculated from the model of the business communication pair, and if the calculated degree of deviation exceeds the specified reference, it is determined that the normal communication is abused (abnormal).

The straddle correction processing unit 26 determines whether the business communication determined to be malicious communication by the malicious communication detection processing unit 25 is caused by the time slot straddle, and if it is determined to be caused by the time slot straddle, it is re-determined whether or not the malicious communication is being made based on the number of communications in the plurality of time slots.

The communication monitoring apparatus 20 is a computer system constituted of physically one computer or a plurality of computers logically or physically configured, and may operate in separate threads on the same computer, or may operate on a virtual computer built on a plurality of physical computer resources. Further, for example, the communication monitoring apparatus 20 may be separable into a device that generates a business communication pair model and a device that monitors communication using the business communication pair model.

FIG. 9 is an example of the business communication identifier table 201. In the business communication identifier table 201, the communication packet observed in the monitoring target system 1 in the steady state is registered as the normal communication. The business communication identifier table 201 includes, for example, a business communication identifier column 501 indicating a business communication identifier (ID-1) indicating an identifier associated with meta information, a source device column 502 indicating a communication source device, and a destination device column 503 indicating a communication destination device, and a communication port column 504 indicating a communication port.

FIG. 10 is an example of the business communication pair model table 204. The business communication pair model table 204 includes, for example, a business communication pair identifier column 801 indicating a business communication pair identifier (ID-2), a business communication identifier column 802 of the normal communication X and the business communication identifier column 803 of the normal communication Y, the normal communications X and Y constituting the business communication pair, a slope column 804 and an intercept column 805 which are parameters of the model calculated from the communication feature quantity of the business communication pair, and a threshold reference column 806 indicating a threshold reference to be a determination reference of abnormality detection.

A slope shown in the slope column 804 and an intercept shown in the intercept column 805 are the slope and the intercept of the regression equation $Y=aX+b$ of the linear regression model, respectively. In the present embodiment, an example of generating the linear regression model using the least squares method is described, but the model is not limited to this and may be any other model such as a regression curve model.

Figures 11, 12:
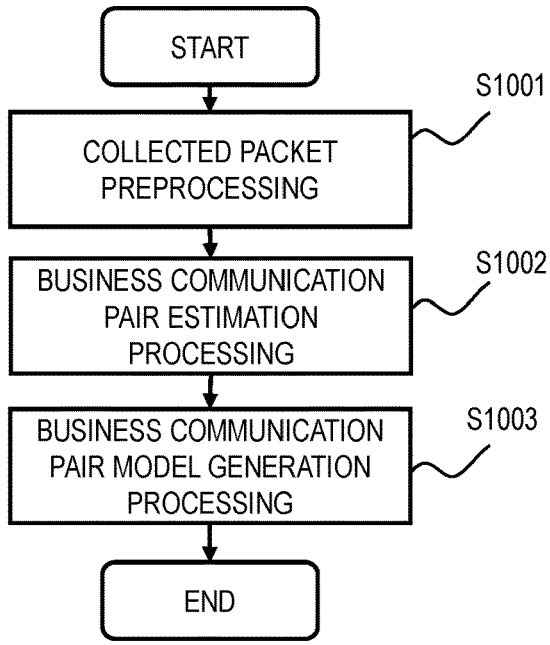
FIG. 11 is an example of a business communication table according to the first embodiment.
FIG. 12 is a flowchart showing an example of learning processing for learning a steady state of a monitoring target system according to the first embodiment.

FIG. 11 is an example of the business communication table 205. The business communication table 205 stores data obtained by aggregating the number of communications of the normal communication in a predetermined time unit, for the normal communication to which the business communication identifier is assigned. The business communication table 205 includes, for example, a time column 901 in which the time of the communication packet generated is indicated by the time slot of a predetermined time unit, and a number of communications column 902 indicating the number of normal communications generated in the time slot of each business identifier.

FIG. 12 is a flowchart showing an example of learning processing for learning the steady state of the monitoring target system 1. In the learning processing, communication packets of when the monitoring target system 1 is operating normally are collected, and a linear regression model that models the relationship between the number of steady communications of the business communication pair is generated. It is desirable that the learning processing be performed in a secure network environment.

In collected packet preprocessing (S1001), the packet collection processing unit 21 collects the communication packets flowing through the network of the monitoring target system 1 and assigns the identifier associated with the meta information to the communication packet, and registers the number of communications for each communication and each time slot in the business communication identifier table 201. Details of step S1001 are described later.

In business communication pair estimation processing (S1002), the business communication pair estimation processing unit 22 refers to the business communication table 205 registered in step S1001 and generates a normal communication pair registered in the business communication identifier table 201.

In business communication pair model generation processing (S1003), the business communication pair model generation processing unit 24 calculates a model representing the steady state of the business communication pair, at least for the normal communication pair having a high degree of business relevance to be described later, and register the model in the business communication pair model table 204. Details of step S1003 are described later.

Figure 13:
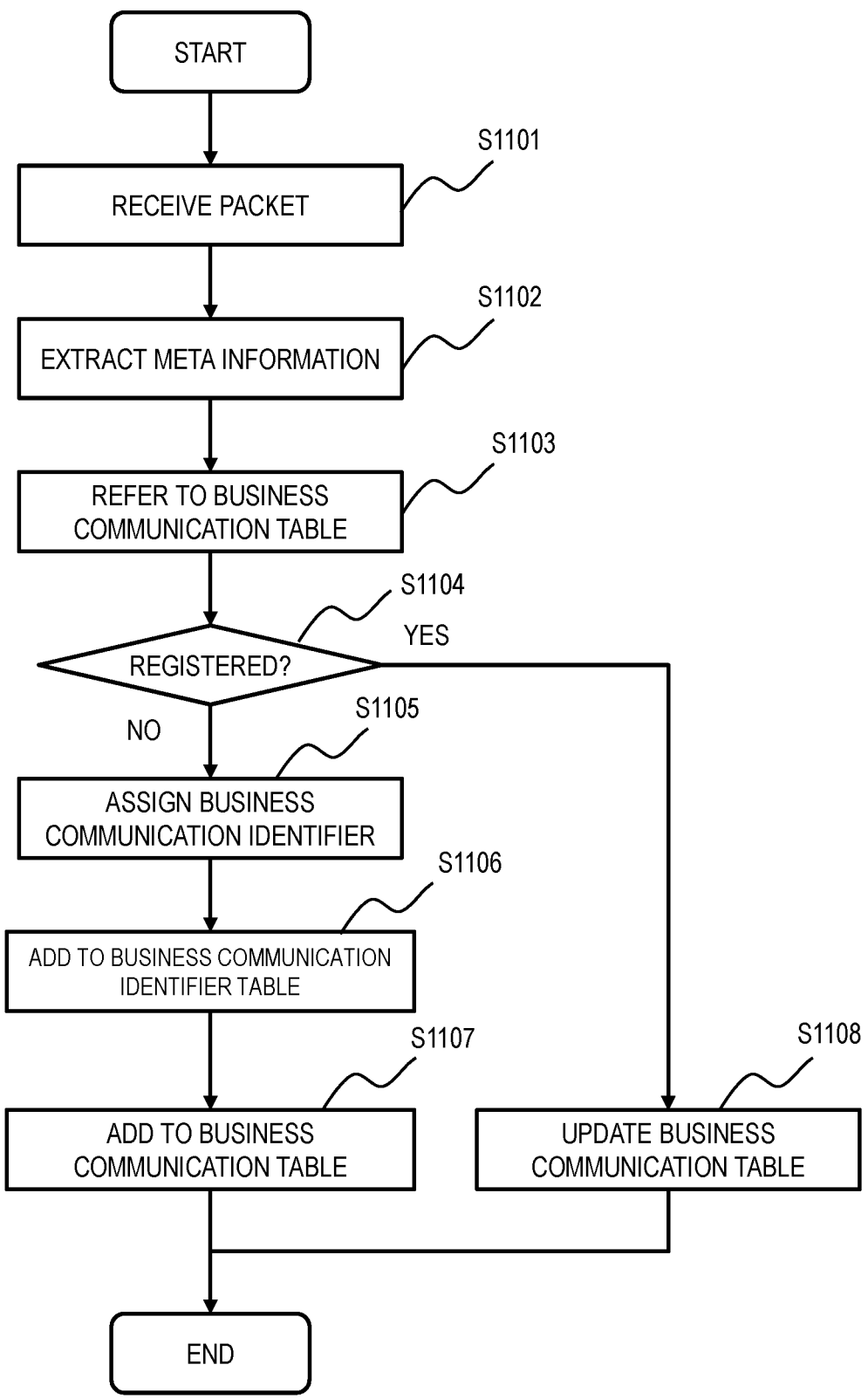
FIG. 13 is a flowchart showing an example of collected packet preprocessing according to the first embodiment.

FIG. 13 is a flowchart showing an example of the collected packet preprocessing in step S1001. The collected packet preprocessing is executed every time the communication monitoring apparatus 20 receives a packet. First, the packet collection processing unit 21 collects the communication packets flowing through the network of the monitoring target system 1 via the IF 214 (S1101).

Next, the packet collection processing unit 21 extracts meta information from the collected communication packets (S1102). For example, time information (YYYY/MM/DD hh: mm: ss) of the communication packet, the IP address of the source device, the IP address of the destination device, the communication protocol, the port number, and others are the meta information to be extracted. Among the meta information, information other than transmission time information of the communication packet is used for identifying the business communication, and therefore, hereinafter, this information is also referred to as business communication meta information. The time added to the communication packet by the device that transmitted the communication packet and the time added to the communication packet by the mirror port 111 or mirror port 112 that received the communication packet are both examples of the time indicated by the time information described above.

Next, the packet collection processing unit 21 refers to the business communication identifier table 201 (S1103), and confirms whether the business communication having the extracted business communication meta information, that is, the business communication (normal communication) having the same transmission device, destination device, and port, is registered in the business communication identifier table 201 (S1104).

If the business communication having the extracted business communication meta information is determined not to be registered in the business communication identifier table 201 (S1104: NO), the packet collection processing unit 21 generates a new business communication identifier as new normal communication for the communication from which the business communication meta information is extracted (S1105). Then, the packet collection processing unit 21 associates the generated business communication identifier with the extracted business communication meta information and registers the above two in the business communication identifier table 201 (S1106).

Next, the packet collection processing unit 21 registers the business communication identifier assigned in step S1105 in the business communication table 205 (S1107). Specifically, the packet collection processing unit 21 increases the number of communications of the business communication identifier of the communication packet by one, in a row of the time (time slot) corresponding to the time information of the communication packet. If there is no row for the time, the packet collection processing unit 21 adds a row of the time slot to which the time belongs, and sets the number of communications of the business communication identifier of the communication packet to one. A time interval of the time slot is preset (for example, to 10 seconds).

If the business communication having the extracted business communication meta information is determined to be registered in the business communication identifier table 201 (S1104: YES), the packet collection processing unit 21 increases data of the number of communications of the business communication identifier of the corresponding time cell row by one, based on the time information of the communication packet (S1108). The processing when there is no corresponding time cell is the same as the similar processing in S1107.

Figure 14:
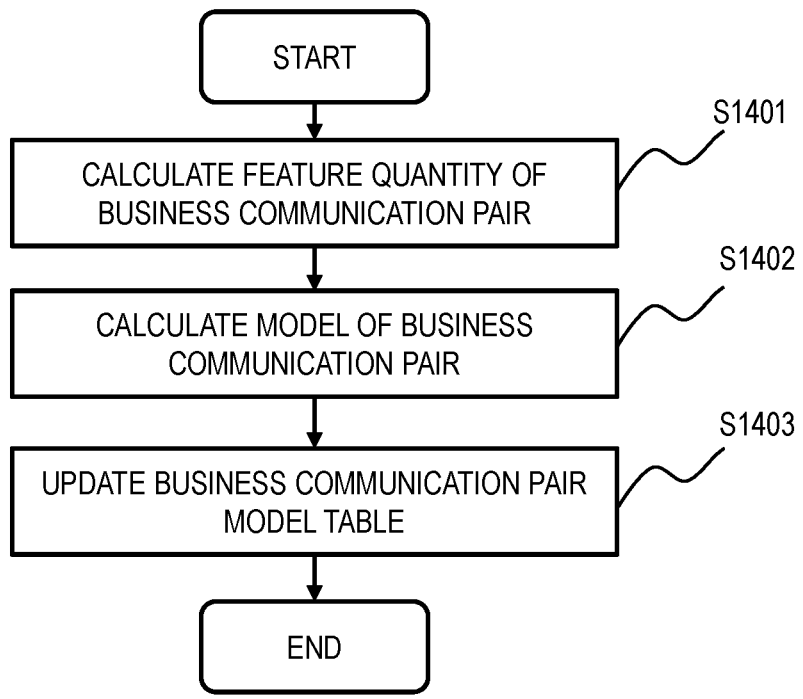
FIG. 14 is a flowchart showing an example of business communication pair model generation processing according to the first embodiment.

FIG. 14 is a flowchart showing an example of business communication pair model generation processing in step S1003 in which the feature quantity of the steady communication of the business communication pair is calculated and the model is generated. The business communication pair feature quantity calculation processing unit 23 refers to the business communication table 205 and calculates the communication feature quantity for each business communication pair (S1401).

The number of X communications, the number of Y communications, the number of communications generated, the total sum of squares of the number of X communications, the total sum of squares of the number of Y communications, the total sum of products of the number of X communications and the number of Y communications, and the like are all examples of the feature quantity. The number of X communications is the total number of X communications in a time slot in which both of the X and Y communications are generated during the learning period. The number of Y communications is the total number of communications of the Y communication in the time slot in which both of the X communication (the one communication of the communication pair) and Y communication (the other communication of the communication pair) are generated during the learning period.

The number of communications generated is the number of time slots in which both of the X communication and the Y communication are generated during the learning period. The total sum of the number of X communications is a value obtained by adding up the number of X communications during the learning period. The total sum of the number of Y communications is a value obtained by adding up the number of Y communications during the learning period. The total sum of the number of communications generated is a value obtained by adding up the number of communications generated during the learning period. The total sum of squares of the number of X communications is a value obtained by adding up the squares of the number of X communications during the learning period. The total sum of squares of the number of Y communications is a value obtained by adding up the squares of the number of Y communications during the learning period. The total sum of products of the number of X communications and the number of Y communications is a value obtained by adding up the products of the number of X communications and the number of Y communications during the learning period.

The business communication pair model generation processing unit 24 extracts the business communication pair from the business communication pair estimated in step S1002 whose value of the degree of business relevance is higher than the threshold value of the degree of relevance (e.g., 0.8) set in advance, and generates a list of the business communication pairs with strong relevance (relevant business communication pair list) (S1402).

The business communication pair model generation processing unit 24 calculates, for example, the absolute value of the correlation coefficient between the number of X communications and the number of Y communications as the degree of business relevance (or the correlation coefficient itself may be used). The correlation coefficient for the business communication pair can be calculated from the total sum of the number of communications generated, the sum of the number of X communications, the sum of the number of Y communications, the sum of squares of the number of X communications, the sum of squares of the number of Y communications, and the total sum of products of the number of X communications and the number of Y communications, during the learning period.

Next, the business communication pair model generation processing unit 24 calculates a model representing the steady state of the business communication pair based on the feature quantity calculated in step S1401 and stores the model in the business communication pair model table 204 (S1403).

In the case of the model representing the steady state of the business communication pair being a linear regression model, the slope and the intercept, which are the parameters of the regression equation Y=a (slope) X+b (intercept), and the threshold reference are calculated. The threshold reference is the standard deviation of the residuals of the Y communication on the regression line. In the example of FIG. 10, zero is stored as the values of the slope column 804, the intercept column 805, and the threshold reference column 806, for the business communication pair not included in the relevant business communication pair list.

Figure 15:
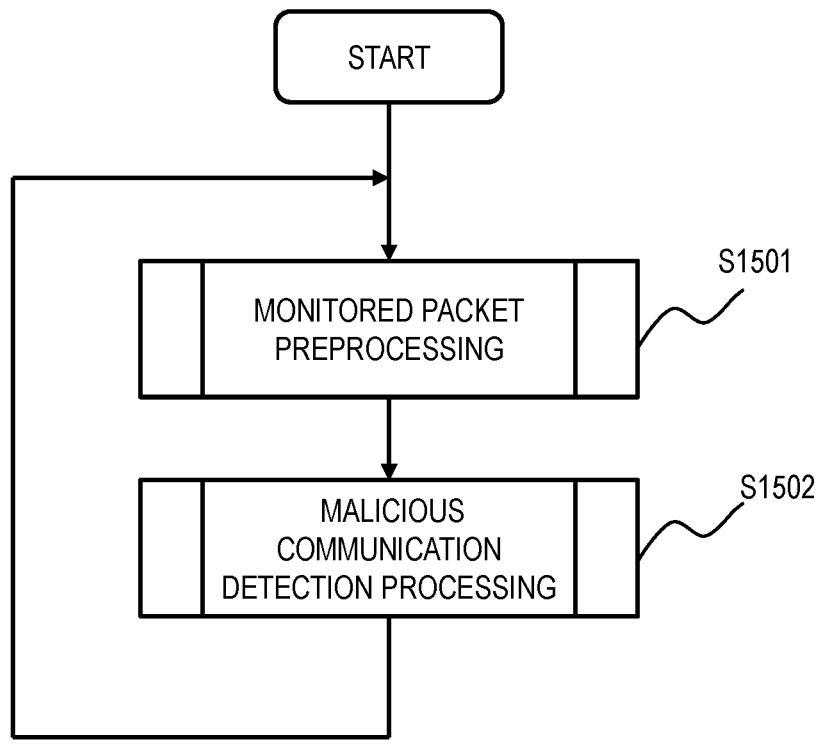
FIG. 15 is a flowchart showing an example of communication monitoring processing according to the first embodiment.

FIG. 15 is a flowchart showing an example of communication monitoring processing. The communication monitoring processing is executed after the business communication pair model is generated, for example, according to an instruction to start the communication monitoring processing by a user. In the communication monitoring processing, the number of steady communications is calculated from the model of the business communication pair corresponding to the input communications, and the calculated number of communications is compared with the number of input communications to determine whether or not the normal communication is abused.

First, the packet collection processing unit 21 performs monitored packet preprocessing (S1501) on the communication packet to be monitored. Because the monitored packet preprocessing in step S1501 is the same as the packet preprocessing in step S1001, the description thereof is omitted. At least one time slot is required as the communication monitoring target period (malicious communication detection target period) in the packet preprocessing.

Subsequently, the malicious communication detection processing unit 25 compares the input communication with the model of the corresponding business communication pair, and executes malicious communication detection processing of determining whether or not the normal communication is abused (S1502). The details of the malicious communication detection processing are described later with reference to FIG. 15.

FIG. 15 is a flowchart showing an example of communication monitoring processing. The communication monitoring processing is executed after the business communication pair model is generated, for example, according to an instruction to start the communication monitoring processing by a user. In the communication monitoring processing, the number of steady communications is calculated from the model of the business communication pair corresponding to the input communications, and the calculated number of communications is compared with the number of input communications to determine whether or not the normal communication is abused.

First, the packet collection processing unit 21 performs the monitored packet preprocessing for the communication packet to be monitored (S1501). Because the monitored packet preprocessing in step S1501 is the same as the packet preprocessing in step S1001, the description thereof is omitted. However, when straddle correction processing is performed, there are required the number of communications in at least three time slots (malicious communication detection target period t(n), t(n−1) which is one time slot before t(n), and t(n+1) which is one time slot after t(n)).

Subsequently, the malicious communication detection processing unit 25 compares the input communication (communication in the three time slots) with the model of the corresponding business communication pair, and executes the malicious communication detection processing of determining whether or not the malicious communication is being made (S1502). The details of the malicious communication detection processing are described later with reference to FIG. 16.

Although details are described later, when the malicious communication detection processing unit 25 determines that the normal communication is being made (malicious communication is not being made), the processing returns to step S1501. If the malicious communication detection processing unit 25 determines that the malicious communication is being made, the straddle correction processing unit 26 executes the straddle correction processing described later. In the straddle correction processing, the straddle correction processing unit 26 uses, for example, the number of communications in the latest three time slots ($t(n-1)$, $t(n)$, $t(n+1)$) to determine whether the time slot straddle has occurred, and to correct the straddle.

Figure 16:
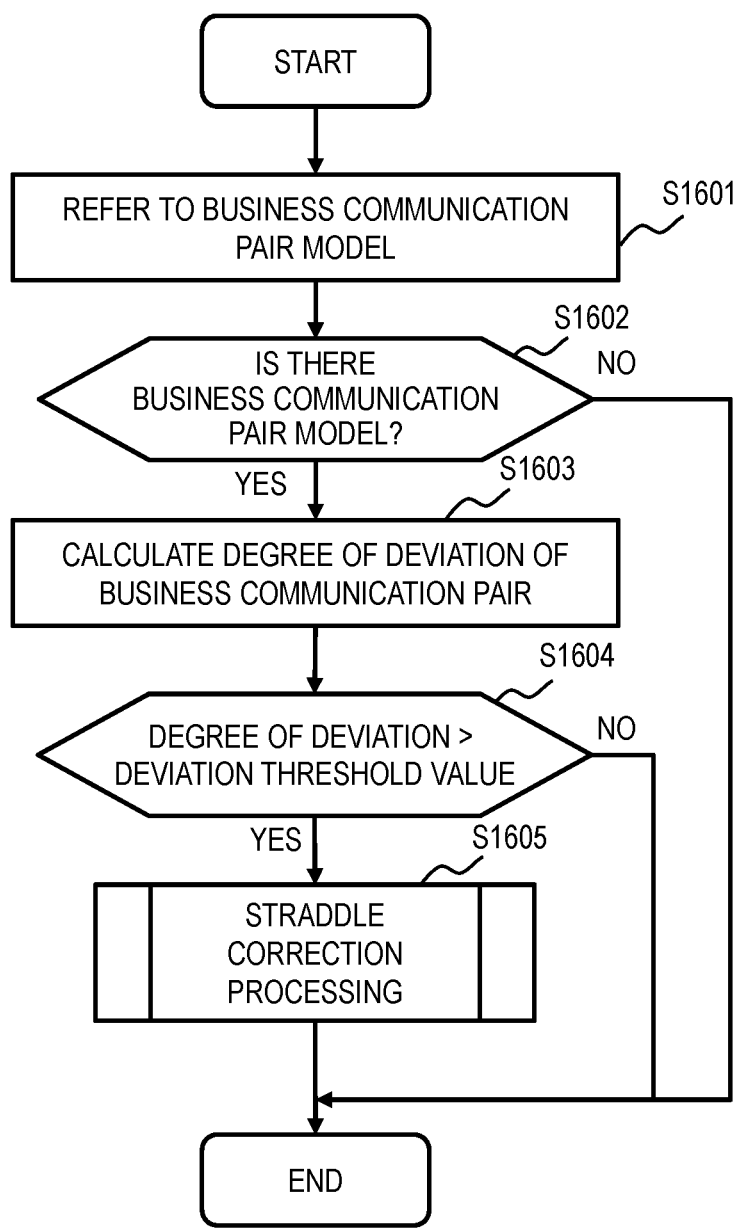
FIG. 16 is a flowchart showing an example of malicious communication detection processing according to the first embodiment.

FIG. 16 is a flowchart showing an example of malicious communication detection processing of detecting the abuse of the normal communication by comparing the number of input communications with the business communication pair model in step S1502. This processing is executed for the number of communications in the three time slots ($t(n-1)$, $t(n)$, $t(n+1)$) each time the number of communications in the communication pair is generated in S1501.

First, the malicious communication detection processing unit 25 refers to the business communication pair model table 204 (S1601), and determines whether there is stored model information consisting of the communications generated in the time slot $t(n)$ as the malicious communication detection target period (for example, the time slot to which the present time belongs) (S1602).

If the model information is determined not to be stored in the business communication pair model table 204 for all the communication pairs generated in the time slot $t(n)$ (S1602: NO), the malicious communication detection processing unit 25 ends the processing.

If the model information of any of all the communication pairs generated in the time slot $t(n)$ is determined to be stored in the business communication pair model table 204 (S1602: YES), the malicious communication detection processing unit 25 calculates the number of steady communications from the model, and calculates a degree of deviation from the difference between the calculated number of steady communications of the model and the number of input communications, for each business communication pair (S1603). Specifically, for example, the malicious communication detection processing unit 25 calculates a value obtained by dividing the absolute value of the difference between the number of steady communications indicated by the model and the number of input communications by a threshold reference, as the degree of deviation.

Next, the malicious communication detection processing unit 25 compares the calculated degree of deviation with each of the business communication pairs with a predetermined deviation threshold value (for example, four times the threshold reference) (S1604). If the business communication pair whose calculated degree of deviation is larger than the deviation threshold value is determined to exist (S1604: YES), the malicious communication detection processing unit 25 ends the malicious communication detection processing because there is a possibility that the malicious communication is being made. Then, after the straddle correction processing unit 26 executes the straddle correction processing (S1605), the processing is ended, that is, the processing returns to the monitored packet preprocessing in step S1501. The details of the straddle correction processing are described with reference to FIGS. 17 to 20. If the business communication pair whose calculated degree of deviation is larger than the deviation threshold value is determined not to exist (S1604: NO), the malicious communication detection processing unit 25 ends the processing, that is, the processing returns to the monitored packet preprocessing in step S1501.

Figure 17:
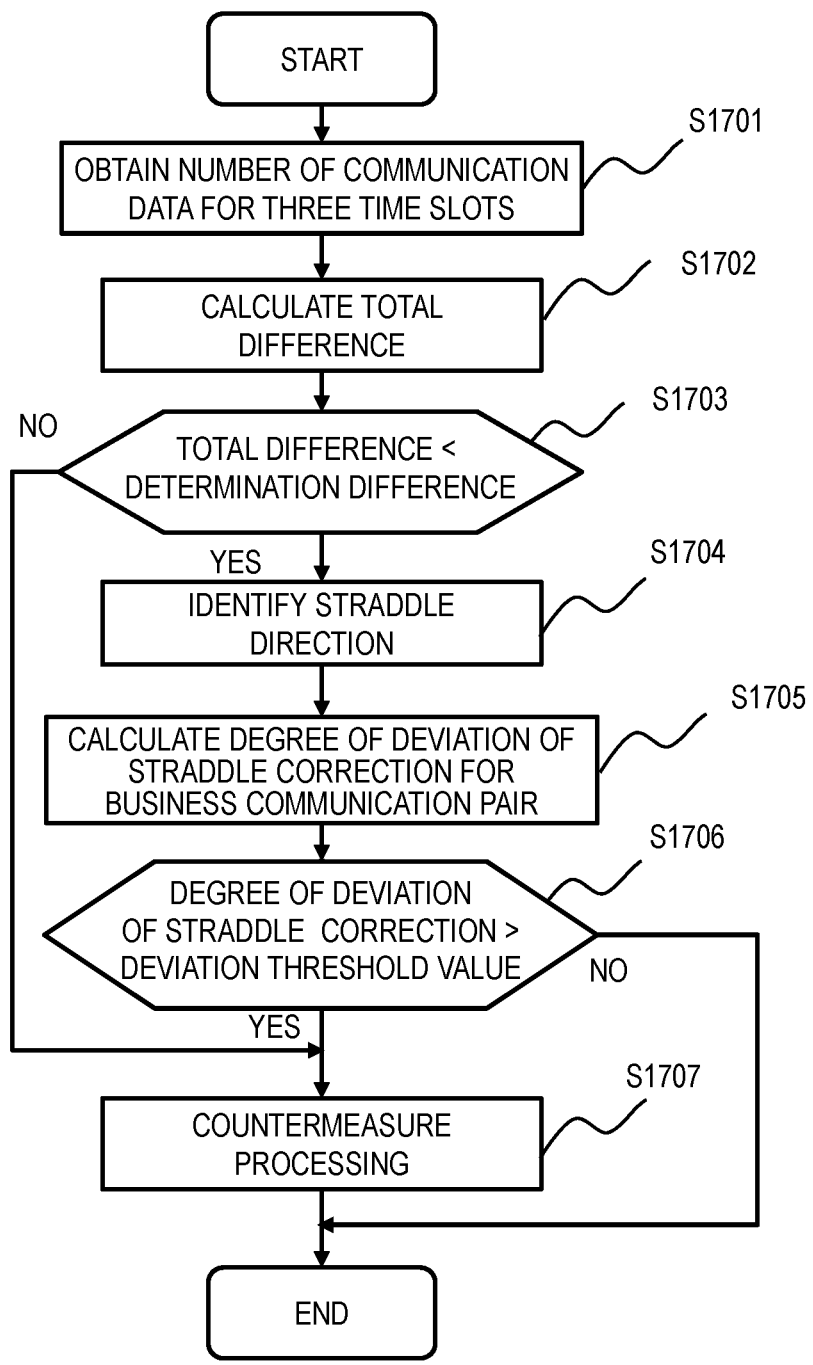
FIG. 17 is a flowchart showing an example of straddle correction processing according to the first embodiment.

FIG. 17 is a flowchart showing an example of straddle correction processing executed by the straddle correction processing unit 26. In the straddle correction processing, first, the straddle correction processing unit 26 acquires, for the business communication pair of the time slot $t(n)$ determined that the malicious communication is being made, the number of communications of the time slots ($t(n-1)$ and $t(n+1)$) immediately before and after the time slot $t(n)$ (S1701).

The straddle correction processing unit 26 acquires the business communication model from the business communication pair model table 204, and calculates the total difference in the time slot $t(n-1)$ and the time slot $t(n)$, and the total difference in the time slot $t(n)$ and the time slot $t(n+1)$, respectively, based on the acquired model (S1702).

Specifically, for example, the straddle correction processing unit 26 substitutes the number of communications of one of the business communication pair into the acquired model, and calculates the expected value of the number of communications for the other of the pair, for each of the time slot $t(n-1)$ and the time slot $t(n)$. Further, the straddle correction processing unit 26 calculates the absolute value of the difference between the sum of the number of communications of the other of the business communication pair in the time slot $t(n-1)$ and the time slot $t(n)$ and the expected value of the number of communications of the other of the pair calculated by substituting the sum of the number of communications of the one of the pair into the acquired model, as the total difference in the time slot $t(n-1)$ and the time slot $t(n)$. Further, the straddle correction processing unit 26 calculates the absolute value of the difference between the sum of the number of communications of the other of the business communication pair in the time slot $t(n)$ and the time slot $t(n+1)$ and the expected value of the number of communications of the other of the pair calculated by substituting the sum of the number of communications of the one of the pair into the acquired model, as the total difference in the time slot $t(n)$ and the time slot $t(n+1)$.

Subsequently, the straddle correction processing unit 26 calculates the absolute value of the difference between the number of communications of the other of the pair in the time slot $t(n)$ and the number of communications of the other of the pair calculated using the model, as a determination difference, and determine whether each total difference is smaller than the determination difference (S1703). If at least one of the total differences is determined to be smaller than the determination difference (S1703: YES), the straddle correction processing unit determines that the time slot straddle has occurred and identifies the straddle direction (S1704). If both of the total differences are equal to or greater than the determination difference (S1703: NO), the straddle correction processing unit 26 determines that the malicious communication is being made, and executes countermeasure processing such as outputting an alert to the input/output device 215 for the business communication pair (S1707).

In step S1704, the straddle correction processing unit 26 determines that the time slot straddle has occurred between the time slots corresponding to the smaller total difference between the two total differences. Following step S1704, the straddle correction processing unit 26 calculates the degree of deviation in the time slot $t(n)$ and the time slot ($t(n-1)$ or $t(n+1)$) in the straddle direction (S1705). Specifically, for example, similarly to step S1603, for the time slot $t(n)$ and the time slot ($t(n-1)$ or $t(n+1)$) in the straddle direction, the straddle correction processing unit 26 calculates, as the degree of deviation, a value obtained by dividing the absolute value of the difference between the sum of the number of communications of the other of the pair and the expected value of the number of communications of the other of the pair obtained by substituting the sum of the number of communications of the one of the pair into the model, by the threshold reference indicated by the model.

If the two total differences have the same value, the straddle correction processing unit 26 determines that the straddle has occurred over the time slots before and after the time slot t(n), that is, over the three time slots. For the periods of t(n−1), t(n), and t(n+1), the straddle correction processing unit 26 calculates, as the degree of deviation, a value obtained by dividing the absolute value of the difference between the sum of the number of communications of the other of the pair in the business communication pair and the expected value of the number of communications of the other of the pair calculated by substituting the sum of the number of the communications of the one of the pair into the acquired model, by the threshold reference indicated by the model.

Subsequently, the straddle correction processing unit 26 determines whether the calculated degree of deviation is larger than the deviation threshold value (S1706). If the calculated degree of deviation is determined to be larger than the deviation threshold value (S1706: YES), the straddle correction processing unit 26 determines that the malicious communication is being made, and executes the countermeasure processing in step S1707. If the calculated degree of deviation is determined to be equal to or less than the deviation threshold value (S1707: NO), the straddle correction processing unit 26 determines that the false positives has occurred due to the time slot straddle, and ends the processing, that is, the processing returns to the monitored packet preprocessing in step S1501.

In the example of FIG. 17, the straddle correction processing unit 26 calculates the total expected value and the total difference using the model, for one time slot immediately before and after t(n) (t(n−1) and t(n+1)), respectively, to identify the straddle direction and determine the presence of the malicious communication. However, the time slot straddle could have occurred over more than three time slots, and accordingly, the total expected value and the total difference may be calculated using the same method for two or more time slots immediately before and after t(n), to identify the straddle direction and determine the presence of the malicious communication.

Further, the straddle correction processing unit 26 may only determine the presence of the malicious communication by calculating the total expected value and the total difference using the model, for only one of the time slots immediately before and after t(n) in only one of the straddle directions, without selecting the straddle direction (that is, without executing the processing in step S1704).

Figures 18, 19:
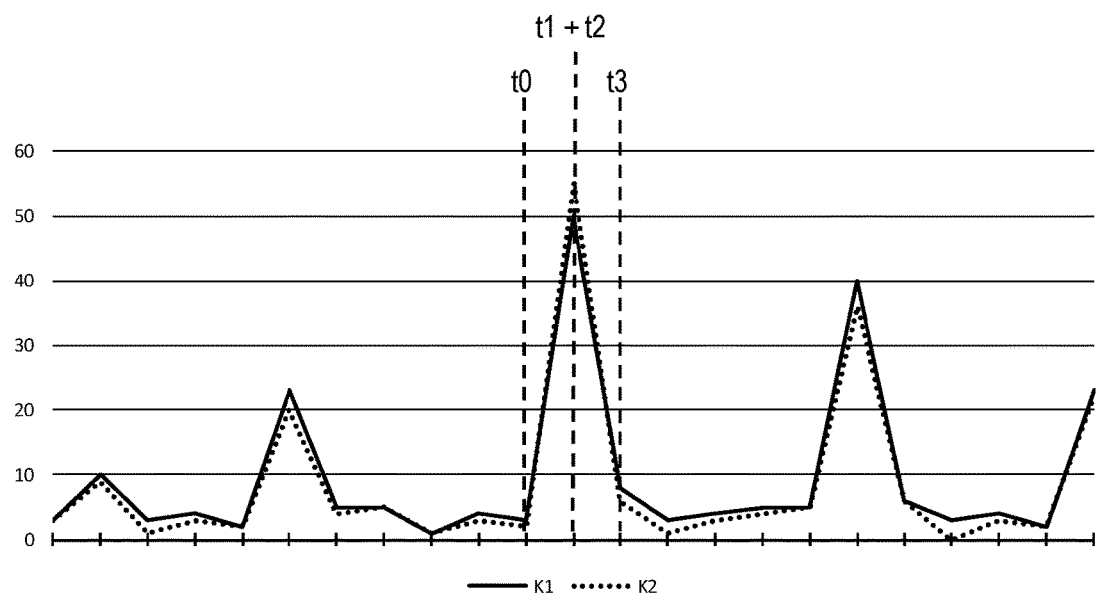
FIG. 18 is a table showing specific examples of values calculated in the straddle correction processing according to the first embodiment.
FIG. 19 is an example of a graph obtained by correcting the time axis graph of FIG. 5 in a straddle direction according to the first embodiment.

FIG. 18 is a table showing a specific example of the values calculated in the straddle correction processing described with reference to FIG. 17. In the example of FIG. 18, for the business communication pair consisting of the communication KP1 and the communication KP2 in the time slot t1, the degree of deviation is determined in step S1604 to be larger than the deviation threshold value (that is, it has been determined that there is a possibility of the malicious communication being made). Therefore, in addition to the number of communications in the time slot t1 of the communication KP1 and the communication KP2, the number of communications in the time slot t0 and the number of communications in the time slot t2 are acquired, the time slots t0 and t2 being immediately before and after the time slot t1.

In columns 1801 and 1802, the number of communications of the communication KP1 and the number of communications of the communication KP2 for each time slot are stored, respectively. A column 1803 stores the expected value of the number of communications of the communication KP2 obtained by substituting the number of communications of the communication KP1 into the model corresponding to the business communication pair in the time slot t0 and the time slot t1. A column 1804 stores the absolute value of the difference between the expected value of the number of communications of the communication KP2 and the number of communications of the communication KP2 in the time slot t0 and the time slot t1.

A column 1811 stores the sum of the number of communications of the communication KP1, for each of the combination of the time slot t0 and the time slot t1 and the combination of the time slot t1 and the time slot t2. A column 1812 stores the sum of the number of communications of the communication KP2, for each of the combination of the time slot t1 and the time slot t1 and the combination of the time slot t1 and the time slot t2.

A column 1813 stores the sum of the expected values of the number of communications of the communication KP2 in the time slot t0 and the time slot t2. Specifically, a cell corresponding to the time slot t0 in column 1813 stores the expected value of the number of communications of the communication KP2 obtained by substituting the sum of the number of communications of the communication KP1 in the time slot t0 and the time slot t1 into the model. Further, a cell corresponding to the time slot t2 in column 1813 stores the expected value of the number of communications of the communication KP2 obtained by substituting the sum of the number of communications of the communication KP1 in the time slot t1 and the time slot t2 into the model. In the case in which the expected value of the number communications of the communication KP2 in the time slot t2 has been calculated, the cell of the column 1813 corresponding to the time slot t2 stores the sum of the expected values of the number of communications of the communication KP2 in the time slot t1 and the time slot t2.

A column 1814 stores the total difference. In the example of FIG. 18, because the total difference between the time slot t0 and the time slot t1 is 43, and the total difference between the time slot t1 and the time slot t2 is 5 (and because 5<43), the time slot straddle has occurred between the time slot t1 and the time slot t2 (that is, the straddle direction is the t2 direction).

FIG. 19 is a graph obtained by correcting the time axis graph of FIG. 5 in the straddle direction. The time slot t0 and the time slot t3 in FIG. 19 correspond to the time slot t1 and the time slot t3 in FIG. 5, respectively. The time slot t1+t2 in FIG. 19 is a state in which the time slot straddle has occurred between the time slot t1 and the time slot t2 and the straddle has been corrected.

Figure 20:
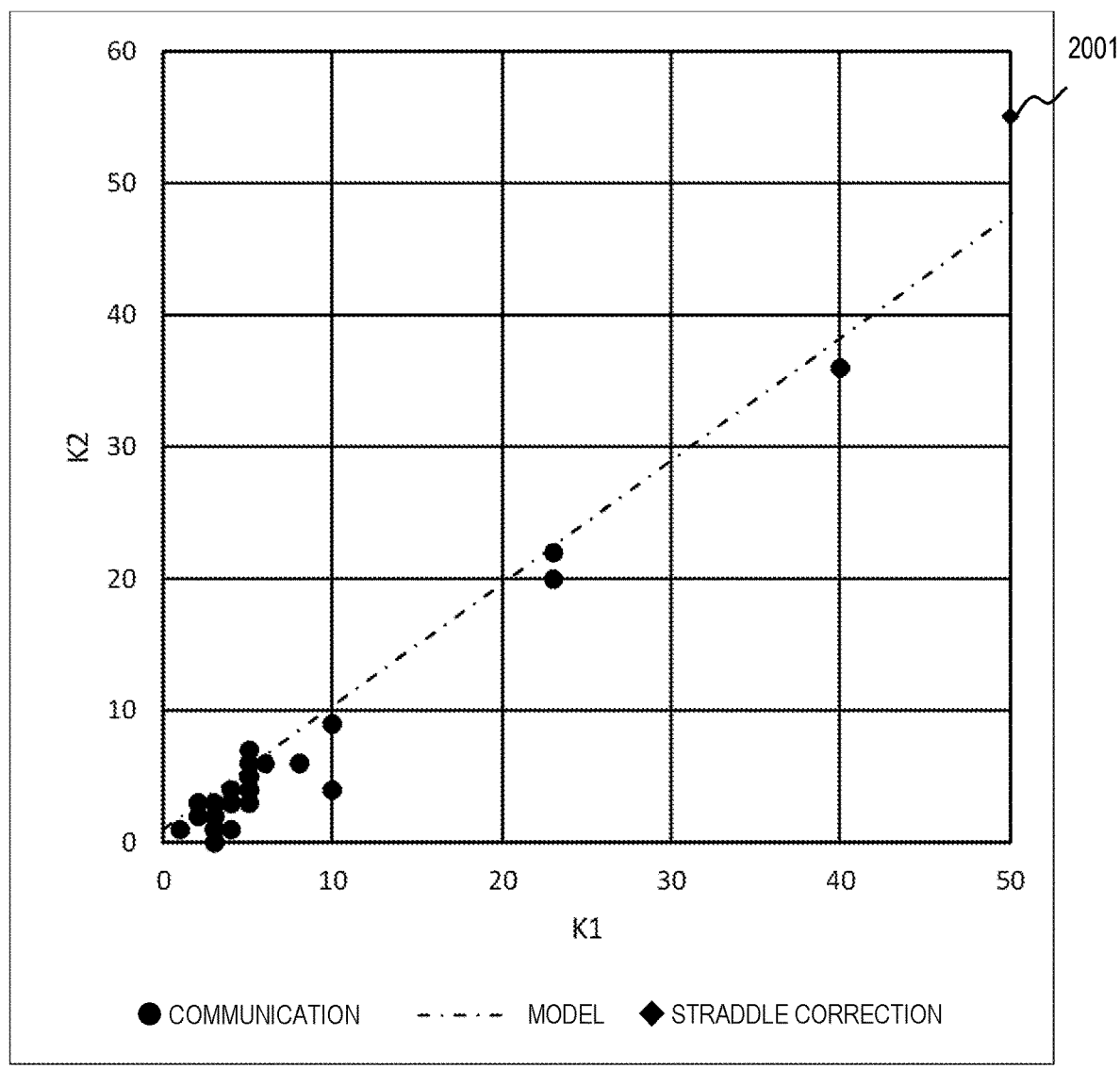
FIG. 20 is an example of a dispersion diagram obtained by correcting the dispersion diagram of FIG. 6 in a straddle direction according to the first embodiment.

FIG. 20 is a dispersion diagram obtained by correcting the dispersion diagram of FIG. 6 in the straddle direction. A point 2001 indicates the number of communications of the communication K1 and the number of communications of the communication K2 in a state in which the time slot straddle has occurred between the time slot t1 and the time slot t2 and the straddle has been corrected.

As described above, the communication monitoring apparatus 20 according to the present embodiment can determine whether the business communication is being executed as specified from the feature quantity indicating the relationship of the business communication pair, and can detect the abuse of the normal communication. Further, if it is determined that there is a possibility of the malicious communication being made, the communication monitoring apparatus 20 can determine whether the time slot straddle has occurred from the number of communications in the preceding and following time slots, and the false positives due to the time slot straddle can be suppressed by correcting the time slot straddle.

Further, in step S1706, the communication monitoring apparatus 20 compares the degree of deviation of the straddle correction with the deviation threshold value, during the total period of two time slots in which the time slot straddle has occurred. Accordingly, the false positives can be suppressed without reducing the frequency of overlooking the true abnormality.

In the present embodiment, the communication monitoring apparatus 20 has identified the business communication pair consisting of two communications. However, a method may be adopted in which a business communication group consisting of two or more communications is identified, a model indicating the relationship with the business communication group is generated, and an malicious communication is detected based on the difference between the communication at the time of detection and the model, similarly to the method described above.

Although the present disclosure has been described with reference to example embodiments, those skilled in the art will recognize that various changes and modifications may be made in form and detail without departing from the spirit and scope of the claimed subject matter.

For example, the above-described embodiment has been described in detail in order to explain the present invention in a manner that is easy to understand, and is not necessarily limited to those including all the configurations described. For example, a part of the configuration of one embodiment can be replaced with the configuration of another embodiment, and the configuration of another embodiment can be added to the configuration of one embodiment. Further, a part of the configuration of each embodiment can be deleted, replaced with another configuration, or added with another configuration.

Moreover, each of the above-described configurations, functions, and the like may be partially or entirely realized by hardware by designing using such as an integrated circuit. Further, each of the above-described configurations, functions, and the like may be realized by software by such as a processor interpreting and executing a program for realizing each of the functions. The information such as a program, a table, and a file that realize each of the functions can be placed in a recording device such as a memory, a hard disk, or an SSD, or in a recording medium such as an integrated circuit (IC) card, a secure digital (SD) card, or a digital versatile disc (DVD).

Further, control lines and information lines are shown to be necessary for explanation, and not all the control lines and the information lines on the product are necessarily shown. In practice, almost all configurations may be considered to be connected to each other.

What is claimed is:

1. A communication monitoring apparatus that monitors communication of a monitoring target system, comprising:
a processor and a memory,
wherein the memory holds
a communication pair model indicating a relationship of a number of communications of a communication pair in the monitoring target system and generated based on the number of communications of the communication pair generated in a common time band, and
communication information indicating the number of communications of each of the communication pair generated during a determination target period and a predetermined number of periods before or after the determination target period,
wherein the processor is configured to:
obtain the number of communications of each of the communication pair during the determination target period from the communication information;
calculates a number of model communications of another of the communication pair during the determination target period from the communication pair model and the number of communications of a one of the communication pair during the determination target period;
if an abnormality is determined to have possibly occurred in a communication of the communication pair during the determination target period, based on a comparison result of comparing a value based on a first difference being a difference between the number of communications of the other of the communication pair during the determination target period and the number of model communications, with a threshold value based on a residual of the communication pair model,
obtain the number of communications of the communication pair during at least one period of before or after the determination target period, from the communication information; and
based on the number of communications of the communication pair during a period formed by adding the determination target period and the at least one period, and on the communication pair model, determines whether the abnormality has occurred in the communication of the communication pair.

2. The communication monitoring apparatus according to claim 1,
wherein the processor is configured to:
if the abnormality is determined to have possibly occurred,
calculate a total number of communications of the other of the communication pair during a total period formed by adding the determination target period and the at least one period;
from the communication pair model and the number of communications of the one of the communication pair during the total period, calculate a total number of model communications of the other of the communication pair during the total period; and
based on a comparison result of comparing a value based on a second difference being a difference between the number of communications of the other of the communication pair during the total period and the total number of model communications, with a threshold value based on a residual of the communication pair model, determine whether an abnormality has occurred in the communication of the communication pair during the determination target period.

3. The communication monitoring apparatus according to claim 2,
wherein the communication information indicates the number of communications of each of the communication pair generated during the determination target period and a predetermined number of periods before or after the determination target period,
wherein the processor is configured to:
obtain the number of communications of the communication pair during a preceding period being at least one period before the determination target period, and during a following period being at least one period after the determination target period, from the communication information;

calculate a total number of communications of the other of the communication pair during a total preceding period formed by adding the determination target period and the preceding period;

calculate a total number of communications of the other of the communication pair during a total following period formed by adding the determination target period and the following period;

based on the communication pair model and on the number of communications of the one of the communication pair in at least one of the preceding period and the following period, calculate a total number of preceding model communications and a total number of following model communications during the total preceding period and the total following period;

based on a difference between the number of communications of the other of the communication pair during the total preceding period and the total number of preceding model communications, and a difference between the number of communications of the other of the communication pair during the total following period and the total number of following model communications, identify a period in which the communication of the communication pair straddles from the preceding period or the following period; and based on a comparison result of comparing a value based on a difference between the number of communications of the other of the communication pair during a period formed by adding the period that is identified and the determination target period and the total number of model communications, with a threshold value based on a residual of the communication pair model, determines whether an abnormality has occurred in the communication of the communication pair during the determination target period.

4. The communication monitoring apparatus according to claim 3, wherein the preceding period is a single period immediately before the determination target period, and wherein the following period is a single period immediately after the determination target period.

5. The communication monitoring apparatus according to claim 2, wherein the processor is configured to determine that the abnormality has occurred when a degree of deviation exceeds the threshold value, the degree of deviation being a quotient of an absolute value of the second difference divided by a threshold reference being a standard deviation of the residual.

6. The communication monitoring apparatus according to claim 1, wherein the processor is configured to:

from a communication observed from the monitoring target system during a learning period, estimate the communication pair based on the number of communications generated in a common time band;

generate the communication pair model based on a feature quantity calculated from the number of communications generated in the common time band during the learning period of the communication pair; and store in the memory the communication pair model that is generated.

7. The communication monitoring apparatus according to claim 6, wherein the processor is configured to estimate, as the communication pair, among communications observed from the monitoring target system during the learning period, a communication in which a correlation coefficient of the number of communications in the common time band is equal to or more than a predetermined value.

8. The communication monitoring apparatus according to claim 7, wherein the processor is configured to generate, as the communication pair model, a regression line indicating a relationship between the number of communications of the communication pair based on the feature quantity.

9. The communication monitoring apparatus according to claim 1, wherein the processor is configured to determine that the abnormality has possibly occurred when a degree of deviation exceeds the threshold value, the degree of deviation being a quotient of an absolute value of the first difference divided by a threshold reference being a standard deviation of the residual.

10. A method of a communication monitoring apparatus monitoring communication of a monitoring target system, wherein the communication monitoring apparatus comprising a processor and a memory, wherein the memory holds a communication pair model indicating a relationship of a number of communications of a communication pair in the monitoring target system and generated based on the number of communications of the communication pair generated in a common time band, and communication information indicating the number of communications of each of the communication pair generated during a determination target period and a predetermined number of periods before or after the determination target period, the method comprising:

the processor obtaining the number of communications of each of the communication pair during the determination target period, from the communication information;

the processor calculating the number of model communications of another of the communication pair during the determination target period from the communication pair model and the number of communications of a one of the communication pair during the determination target period;

if the processor determines that an abnormality has possibly occurred in a communication of the communication pair during the determination target period, based on a comparison result of comparing a value based on a first difference being a difference between the number of communications of the other of the communication pair during the determination target period and the number of model communications, with a threshold value based on a residual of the communication pair model, the processor obtaining the number of communications of the communication pair during at least one period of before or after the determination target period, from the communication information; and based on the number of communications of the communication pair during a period formed by adding the determination target period and the at least one period, and on the communication pair model, the processor determining whether the abnormality has occurred in the communication of the communication pair.

* * * * *